(12) United States Patent
Horimai et al.

(10) Patent No.: US 7,433,293 B2
(45) Date of Patent: Oct. 7, 2008

(54) OPTICAL DISC RECORDING MEDIUM AND METHOD OF MANUFACTURING THE SAME

(75) Inventors: Hideyoshi Horimai, Yokohama (JP); Masaharu Kinoshita, Yokohama (JP); Yoshinobu Tanaka, Akeno-machi (JP); Yoshihiro Takatani, Akeno-machi (JP)

(73) Assignees: Memory-Tech Corporation, Ibaraki (JP); Optware Corporation, Yokohama-shi (JP)

( * ) Notice: Subject to any disclaimer, the term of this patent is extended or adjusted under 35 U.S.C. 154(b) by 449 days.

(21) Appl. No.: 10/555,066

(22) PCT Filed: May 30, 2003

(86) PCT No.: PCT/JP03/06831
§ 371 (c)(1),
(2), (4) Date: Jan. 26, 2006

(87) PCT Pub. No.: WO2004/107328
PCT Pub. Date: Dec. 9, 2004

(65) Prior Publication Data
US 2006/0130090 A1 Jun. 15, 2006

(51) Int. Cl.
*G11B 7/24* (2006.01)
*G11B 7/00* (2006.01)
(52) U.S. Cl. ............... 369/275.1; 369/283; 369/103
(58) Field of Classification Search ............... None
See application file for complete search history.

(56) References Cited

U.S. PATENT DOCUMENTS

| 5,917,798 A | 6/1999 | Horimai et al. |
| 6,272,095 B1 * | 8/2001 | Liu et al. ............... 369/103 |
| 2004/0145788 A1 * | 7/2004 | Leiber et al. ............... 359/3 |

FOREIGN PATENT DOCUMENTS

| JP | A 6-48075 | 2/1994 |
| JP | A 09-305093 | 11/1997 |
| JP | A 10-124872 | 5/1998 |
| JP | A 11-185291 | 7/1999 |
| JP | A 11-219540 | 8/1999 |
| JP | A 11-311936 | 11/1999 |
| JP | A 2000-298879 | 10/2000 |
| JP | A 2001-005368 | 1/2001 |
| JP | A 2002-083431 | 3/2002 |

* cited by examiner

*Primary Examiner*—Muhammad N. Edun
(74) *Attorney, Agent, or Firm*—Oliff & Berridge, PLC (57) ABSTRACT

An optical disc recording medium of the present invention comprises a first substrate (11) having a physically pre-formatted surface; a reflective film (12) formed on the pre-formatted surface of the first substrate (11); a transparent layer (13) with a thickness of 50-430 μm formed on the reflective film (12); a second substrate (15) composed of transparent material and located at a distance of certain spacing from the transparent layer (13); and a recording layer (14) for hologram recording filled between the transparent layer (13) and the second substrate (15).

16 Claims, 11 Drawing Sheets

$$d_H = \frac{2.44 f \lambda}{d_D}$$

FIG. 16

— OPTICAL DISC RECORDING MEDIUM AND METHOD OF MANUFACTURING THE SAME

TECHNICAL FIELD

The present invention relates to an optical disc recording medium having a recording layer for recording holograms and method of manufacturing the same. More particularly, it relates to an optical disc recording medium having a defocusing transparent layer interposed between a recording layer and a pre-formatted reflective layer opposite thereto and method of manufacturing the same.

BACKGROUND ART

A holographic recording system has been known in the art, which employs holograms to record information in an optical disc recording medium at an ultra-high density. In the holographic recording system, an information light for carrying image information is superimposed onto a recording reference light in a recording layer inside the optical disc recording medium to generate an interfered fringe pattern. The fringe pattern is recorded in the recording layer of the optical disc recording medium to write the image information. When information is regenerated from the recorded fringe pattern, a regenerating reference light similar to that on writing is irradiated to the fringe pattern recorded in the optical disc recording medium to cause diffraction by the fringe pattern for regeneration of image information.

Recently, attention is given to the development of volume holography, which also utilizes the thickness of the recording layer in the optical disc recording medium to write fringe patterns three-dimensionally for achievement of a further increased recording density. A recording system according to the volume holography can be employed for further multiplex recording to increase the recording capacity dramatically.

Figure 13:
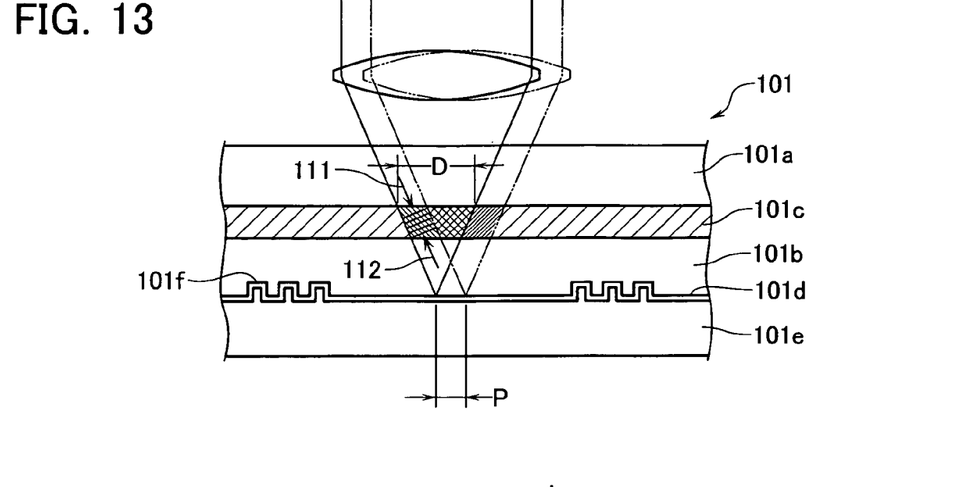
FIG. 13 is an enlarged partial cross-sectional view of an optical disc recording medium in the art.

An apparatus and method according to the volume holography for recording and regenerating information to/from an optical disc recording medium is disclosed in an international publication of WO 99/44195. In order to provide an understanding of the present invention, a brief description is given to the optical disc recording medium for recording the volume holography disclosed in the publication. As shown in FIG. 13, an optical disc recording medium 101 comprises a recording layer 101c for hologram recording provided between circular transparent substrates 101a, 101b, and a reflective film 101d formed on a surface of the transparent substrate 101b opposite to the recording layer 101c. They are bonded to a substrate 101e. The reflective film 101d has a plurality of address servo areas arranged at a certain angular interval in a radial direction of the optical disc recording medium 101. An information recording area is provided between the address servo areas arranged in a circumferential direction. Servo information for focusing serve control and tracking servo control and address information about the information recording area are previously recorded (pre-formatted) with embossed pits 101f in the address servo area.

In a specific configuration of the optical disc recording medium, the transparent substrates 101a, 101b have thicknesses of about 500 μm, and the recording layer 101c has a thickness of about 200 μm. The recording layer 101c is composed of a hologram recording material that varies optical properties such as an index of refraction, a permittivity and a reflectance in accordance with the intensity of a laser light when it is exposed to the laser light for a certain period of time.

In an example of recording by volume holography to the recording layer 101c, an information light 111 carrying information to be recorded and a recording reference light 112 together produce an interfered fringe pattern along the thickness in the recording layer 101c as shown. The information light 111 and the reference light 112 are so irradiated simultaneously for a certain period of time from beyond the transparent substrate 110a to fix the fringe pattern three-dimensionally in the recording layer 101c. The information is thus recorded as a three-dimensional hologram.

Figure 14:
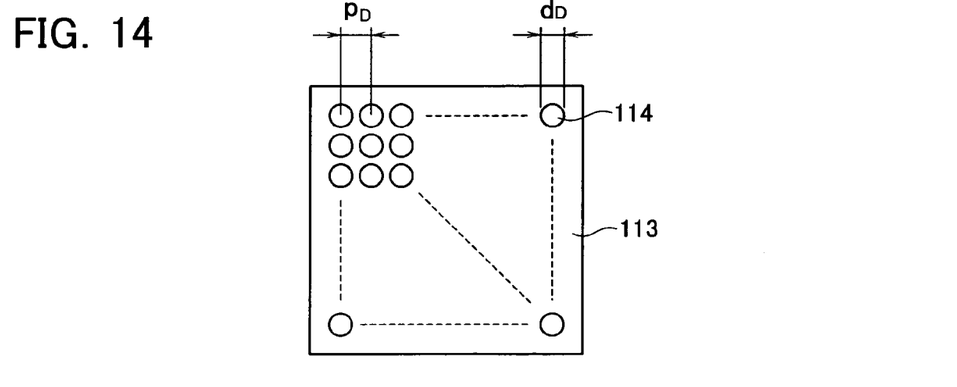
FIG. 14 is a diagram showing a spatial optical modulator that creates two-dimensional data to be written in the optical disc recording medium.

The information to be recorded in the recording layer 101c comprises an information pattern arranged two-dimensionally as shown in FIG. 14, which is given from a spatial optical modulator 113. The information pattern can be obtained by controlling transmission/non-transmission of light through each of two-dimensionally arranged dots 114 that configure the spatial optical modulator. In this case, a spike-like light intensity distribution appears on the hologram surface at a period determined by an arranging pitch $p_D$ of the dots 114 and a focal length f of the lens and a wavelength λ of the recording light and prevents linear recording. Therefore, a defocusing method is employed in the art to slightly displace the hologram surface from the focal length to balance the light intensity distribution. Particularly, in the recording medium with the embossed pits 101f formed therein, location of the recording layer 101c too close to the embossed pit 101f causes an inconvenience on hologram recording/regenerating. Therefore, a transparent substrate 101b with a certain thickness is interposed between the recording layer 101c and the reflective film 101d.

If the thickness of the transparent substrate 101b is too thick, however, a hologram to be recorded has an excessively larger diameter D, which lowers the recording density. An increase in recording density results in an overlap between adjacent holograms. A numeric value indicative of the number of possibly multiplexed holograms that can achieve 100% diffraction efficiency is called M number. The M number is determined by the recording material. If the multiplex number of holograms is equal to M, the regeneration efficiency η is proportional to the square of a value derived from division of the M number by the multiplex number M. Therefore, elevation of the regeneration efficiency requires the multiplex number M to be reduced as low as possible. This requires the transparent substrate 101b to have an appropriate thickness.

The present invention has been made in consideration of such the matters and has an object to provide an optical disc recording medium capable of achieving a high regeneration efficiency and recording at a high recording density and method of manufacturing the same.

DISCLOSURE OF THE INVENTION

A first optical disc recording medium according to the present invention comprises: a first substrate having a physically pre-formatted surface; a reflective film formed on the pre-formatted surface of the first substrate; a transparent layer with a thickness of 50-430 μm formed on the reflective film; a second substrate composed of transparent material and located at a distance of certain spacing from the transparent layer; and a recording layer for hologram recording filled between the transparent layer and the second substrate.

A second optical disc recording medium according to the present invention comprises: a transparent film with a thickness of 50-430 μm having a physically pre-formatted surface; a reflective film formed on the pre-formatted surface of the transparent film; a first substrate arranged to support the transparent film interposing the reflective film therebetween;

a second substrate composed of transparent material and located at a distance of certain spacing from the transparent film; and a recording layer for hologram recording filled between the transparent layer and the second substrate.

The thickness of the transparent film is defined within 50-430 µm for the following reason. If each of the dots in the spatial optical modulator 113 shown in FIG. 14 has a diameter of $d_D$, a diffraction pattern caused from a circular dot is given by the following equation:

$$E(\theta) = J_1(d_D \theta r/\lambda)/(d_D \theta r/\lambda) \quad (1)$$

Figure 15:
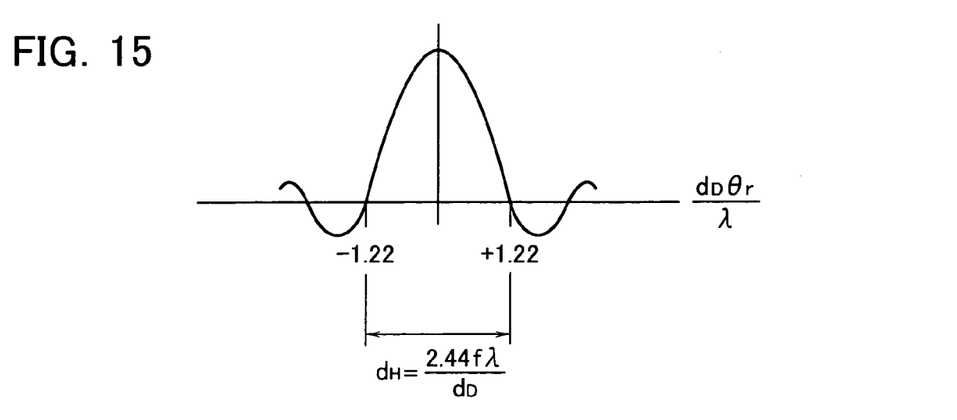
FIG. 15 is a diagram showing a diffraction pattern formed with a single dot.

$J_1(x)/(x)$ is referred to as Airy function, which is a function analogous in waveform to sin x/x except for the first zero points that appear at x=±1.22 as shown in FIG. 15. Accordingly, if a hologram can be assumed to contain at least all information between the first zero points in the diffraction pattern, a minimal diameter $d_H$ of the hologram is given by the following equation:

$$d_H = 2.44 f \lambda / d_D \quad (2)$$

In this equation, f denotes a focal length of the lens, and λ denotes a wavelength of the recording light. The wavelength λ currently available falls within 390-650 nm. The focal length of the lens averages 3 mm. The diameter $d_D$ of the dot in the spatial optical modulator 113 is set to 13.7 µm or 17 µm. Accordingly, when λ=650 nm and $d_D$=13.7 µm are given, the following is derived:

$$d_H = 2.44 \times 3 \times 10^{-3} \times 650 \times 10^{-9} / 13.7 \times 10^{-6} \approx 347 \ \mu m \quad (3)$$

Similarly, when λ=390 nm and $d_D$=17 µm are given, the following is derived:

$$d_H = 2.44 \times 3 \times 10^{-3} \times 390 \times 10^{-9} / 17 \times 10^{-6} \approx 168 \ \mu m \quad (4)$$

If the optical disc recording medium has an internal refractive index of n≈1.52, a wavelength is multiplied by 1/1.52 in the medium. Thus, 1) If λ=650 nm and $d_D$=13.7 µm, then $d_H$≈228 µm; and 2) If λ=390 nm and $d_D$ =17 µm, then $d_H$≈110 µm  (5)

Figure 16:
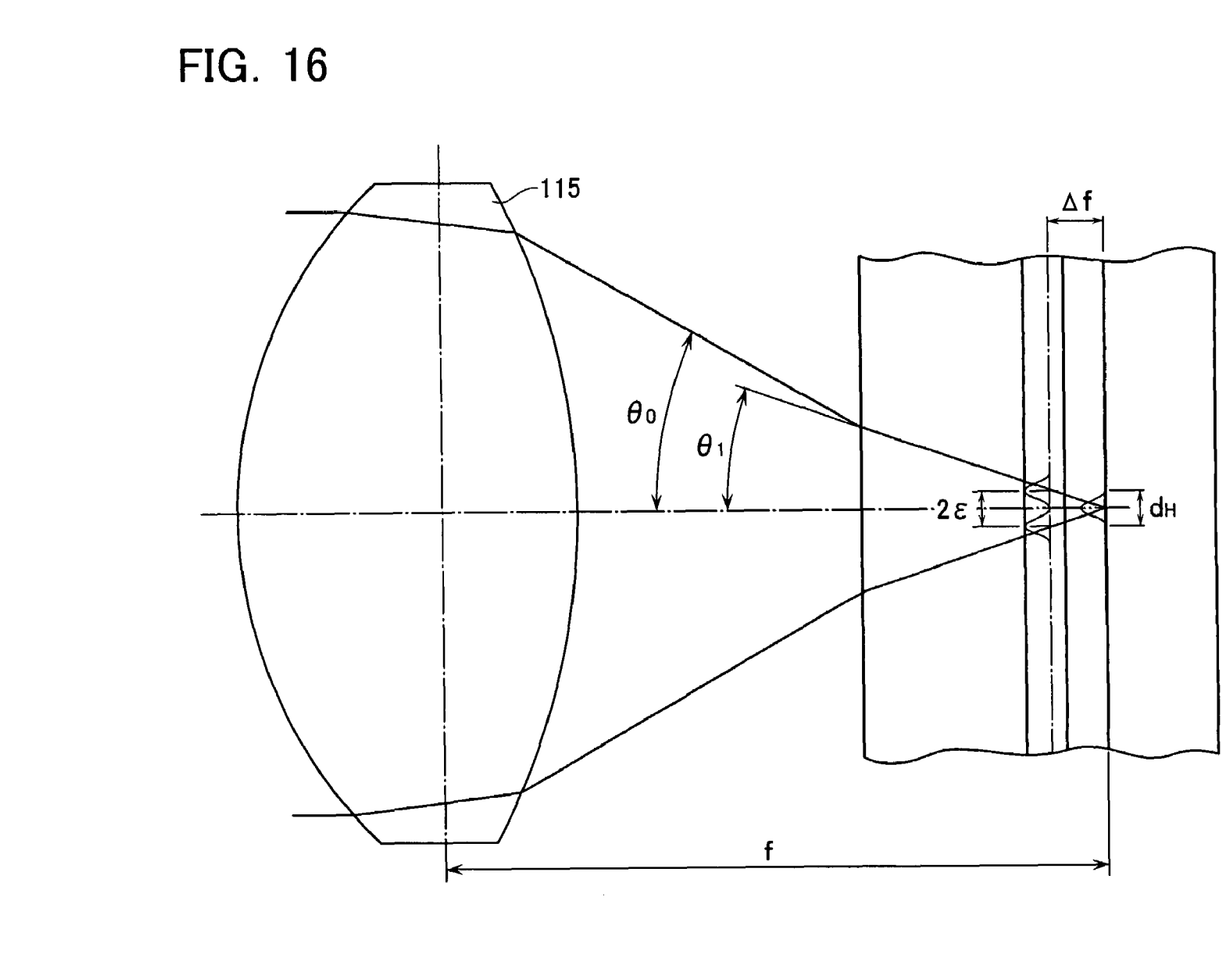
FIG. 16 is a diagram showing a relation between a medium and a lens on recording in the optical disc recording medium.

If the lens 115 has a NA (numerical aperture)=0.5 as shown in FIG. 16, then $\theta_0$=30°. In this case, the following equation is established inside the medium in accordance with Snell's law:

$$n_0 \sin \theta_0 = n_1 \sin \theta_1 \quad (6) \ n_0=1.0 \ (air) \ and \ n_1=1.52 \ (glass)$$

Thus, $$\theta_1 = \sin^{-1}(\sin\theta_0/n_1) \quad (7)$$
$$\sin^{-1}(NA/n_1)$$
$$\approx 19.2°$$

In accordance with a rule of thumb, 268 ≈$d_H$,

1) If λ=650 nm and $d_D$=13.7 µm, then 2ε≈228 µm; and

2) If λ=390 nm and $d_D$=17 µm, then 2ε≈110 µm  (8)

Accordingly, a distance Δf from a focal plane to a hologram formation plane can be derived as follows:

1) If λ=650 nm and $d_D$=13.7 µm, then Δf=(228/2)(1/tan 19.2°) ≈327 µm; and

2) If λ=390 nm and $d_D$=17 µm, then Δf=(110/2)(1/tan 19.2°) ≈158 µm  (9)

In general, the recording layer has a thickness of 200 µm. Therefore, the transparent layer has a thickness of 50-430 µm if the hologram plane (located at a distance of Δf from the focal position) is located near the center of the recording layer.

If λ=532 nm and $d_D$=13.7 µm in the best mode, then $$2\varepsilon = d_H \quad (10)$$
$$= 2.44 \times 3 \times 10^{-3} \times 532 \times 10^{-9}/(1.52 \times 13.7 \times 10^{-6})$$
$$\approx 187 \ \mu m$$

Therefore, Δf is represented by:

$$\Delta f = (187/2)(1/\tan 19.2°) \quad (11)$$
$$\approx 268 \ \mu m$$

Accordingly, the thickness of the transparent layer is about 200 µm in the best mode.

In order to hold the recording layer with stability, preferably the first and second substrates have thicknesses of 0.5 mm or more.

A first method of manufacturing an optical disc recording medium according to the present invention comprises the steps of: forming embossed pits on a surface of a first substrate; forming a reflective film on the embossed-pits-formed surface of the first substrate; forming a transparent layer with a thickness of 50-430 µm on the reflective-film-formed surface of the first substrate; locating a transparent second substrate at a distance of certain spacing from the first substrate so as to interpose the transparent layer therebetween; and filling a recording material for hologram recording between the first substrate and the second substrate to form a recording layer.

In this case, the step of forming a transparent layer may comprise the step of adhering a transparent film on the reflective-film-formed surface of the first substrate, for example.

A second method of manufacturing an optical disc recording medium according to the present invention comprises the steps of: forming embossed pits on a surface of a transparent film with a thickness of 50-430 µm; forming a reflective film on the embossed-pits-formed surface of the transparent film; adhering the transparent film on the first substrate interposing the reflective film therebetween; locating a transparent second substrate at a distance of certain spacing from the first substrate so as to interpose the transparent film therebetween; and filling a recording material for hologram recording between the first substrate and the second substrate to form a recording layer.

In these methods of manufacturing an optical disc recording medium, the step of filling a recording material may comprise the step of filling a recording material by reducing pressure in the spacing between the first and second substrates, for example.

The methods of manufacturing an optical disc recording medium according to the present invention comprise filling the recording material between the first substrate and the second substrate after the transparent layer is formed on the first substrate, instead of filling first the recording layer between the transparent layer and the second substrate. Therefore, the existence of the first substrate facilitates the filling of the recording material without troubles even if the transparent layer is thinned to 50-430 μm.

A third method of manufacturing an optical disc recording medium according to the present invention comprises the steps of: forming embossed pits on a surface of a first substrate; forming a reflective film on the embossed-pits-formed surface of the first substrate; fixing a transparent plate with a thickness of 50-430 μm on the upper surface of a holder, applying a liquid recording material on the transparent plate, and pressing a transparent second substrate against the recording material to form a recording layer composed of the recording material between the transparent plate and the second substrate, thus forming a triple-layered structure; and bonding the reflective-film-formed first substrate and the triple-layered structure together, locating the reflective film faced to the transparent plate.

BEST MODE FOR CARRYING OUT THE INVENTION

The embodiments of the present invention will now be described with reference to the accompanying drawings.

Figure 1:
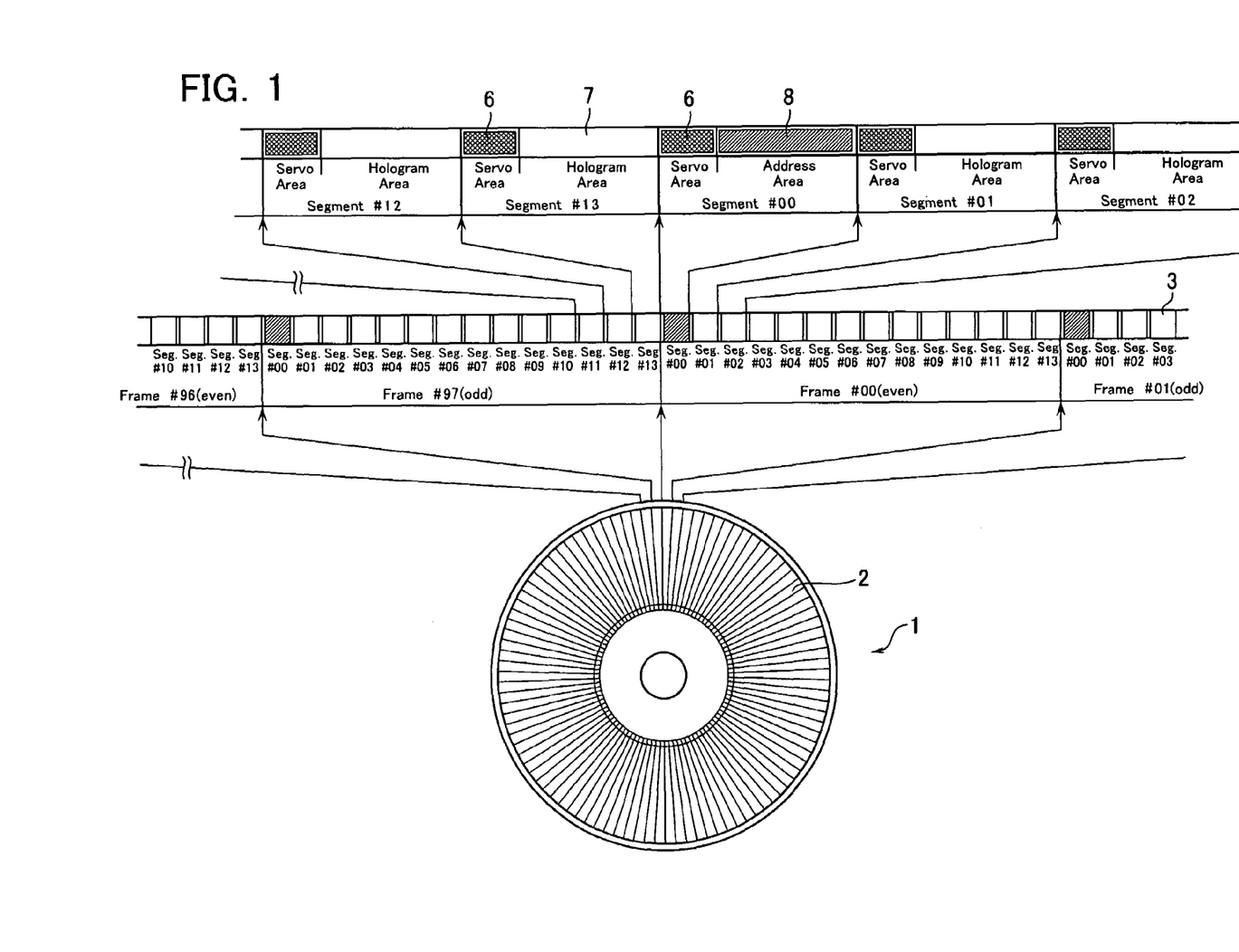
FIG. 1 is an illustrative view of an optical disc recording medium according to an embodiment of the present invention.

FIG. 1 is an illustrative view of an optical disc recording medium according to an embodiment of the present invention.

As shown in FIG. 1, a disc-like optical disc recording medium 1 has a plurality of frames 2 (frames #00-#97 in this example) split in the circumferential direction. Each frame 2 consists of a plurality of segments 3 (segments #00-#13 in this example) further split in the circumferential direction. Each segment 3 includes a servo area 6 and a hologram recording area 7 except between partial adjacent servo areas 6. Formed between partial adjacent servo areas 6 (between a servo area 6 in the segment #00 and a servo area 6 in the segment #01 in this example) is an address area 8 that records address information indicative of an access position.

Each servo area 6 records a servo clock pit serving as a timing reference for various operations in an optical disc recording and regenerating device, and a servo pit for focusing servo and tracking servo in a sampled servo system, for example, previously as embossed pits. The address area 8 records a preamble, a synchronous mark, an address part, an end address mark, a post synchronous mark and a postamble previously by embossed pits. On recording a hologram, the information pre-formatted in the address area 8 is employed to match irradiated positions of an information light, a recording reference light and a regenerating reference light emitted from an optical head to an information recording position in each hologram recording area 7. The optical disc recording and regenerating device utilizes the servo clock pit and the servo pit recorded in the servo area 6 for focusing and tracking. In addition, it detects the address information recorded in the address area 8 to match the irradiated positions of the information light, the recording reference light and the regenerating reference light in each hologram recording area 7. The hologram recording area 7 is a mirror area that is not physically formatted with embossed pits.

Figure 2:
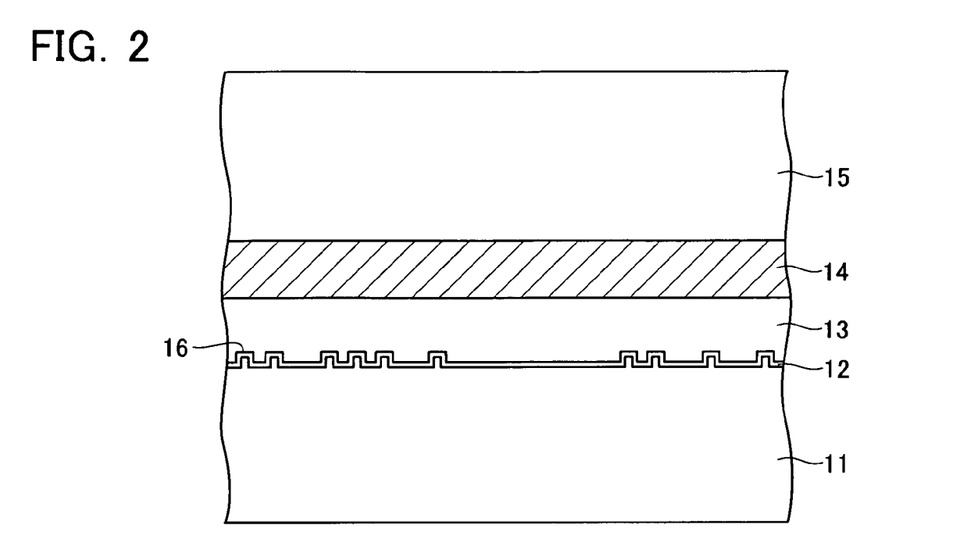
FIG. 2 is an enlarged partial cross-sectional view of the optical disc recording medium.

FIG. 2 is an enlarged partial cross-sectional view of the optical disc recording medium 1.

The optical disc recording medium 1 comprises a circular first substrate 11, a reflective film 12, a transparent layer 13, a recording layer 14 and a second substrate 15 stacked in turn from below in the figure. Embossed pits 16 indicative of at least address information and servo information are formed on a portion of the reflective film 12 between the first substrate 11 and the transparent layer 13. The first substrate 11 is composed of glass or resin such as polycarbonate with a thickness of 0.6-1.2 mm. The reflective film 12 comprises an Al-evaporated layer, for example. The transparent layer 13 has a thickness of 50-430 μm, preferably 200 μm. It is composed of polyethersulfone, polycarbonate, polyolefin or glass, which has high transparency, low double refraction and low water absorption. The recording layer 14 is composed of a hologram recording material that varies optical properties such as an index of refraction, a permittivity and a reflectance in accordance with the intensity of a laser light when it is exposed to the laser light for a certain period of time. For example, Photopolymers HRF-600 (trade name) available from Dupont may be employed. The recording layer 14 is set to have a thickness of about 200 μm. The second substrate 15 is composed of glass or resin such as polycarbonate with a thickness of 0.5 mm.

Methods of manufacturing the optical disc recording medium 1 thus configured will be described next.

Figure 3:
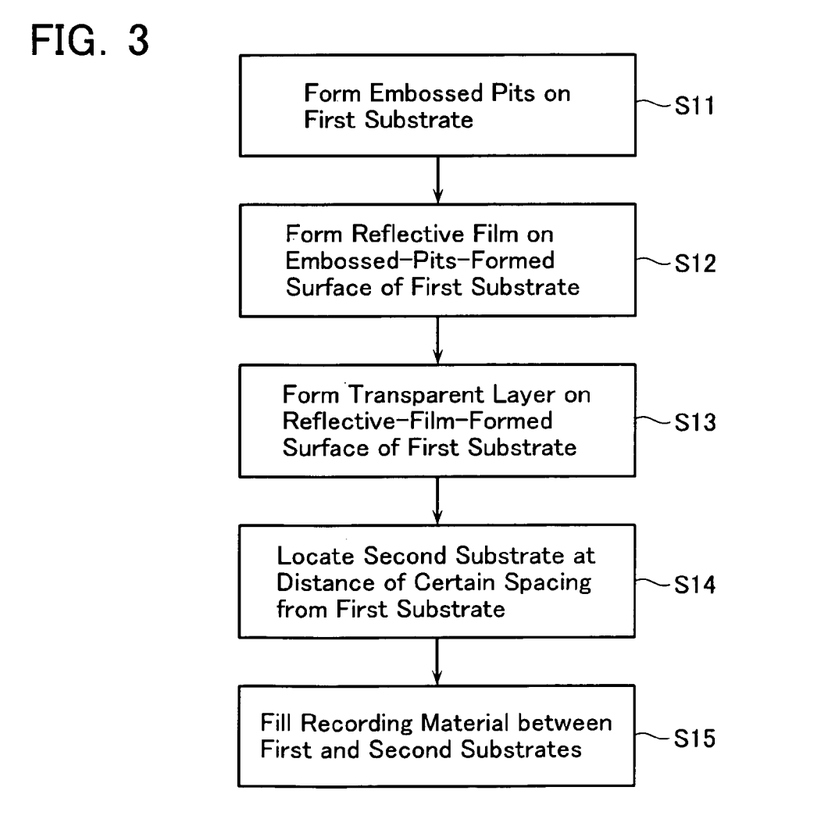
FIG. 3 is a flowchart showing a method of manufacturing the optical disc recording medium.
Figure 4A:
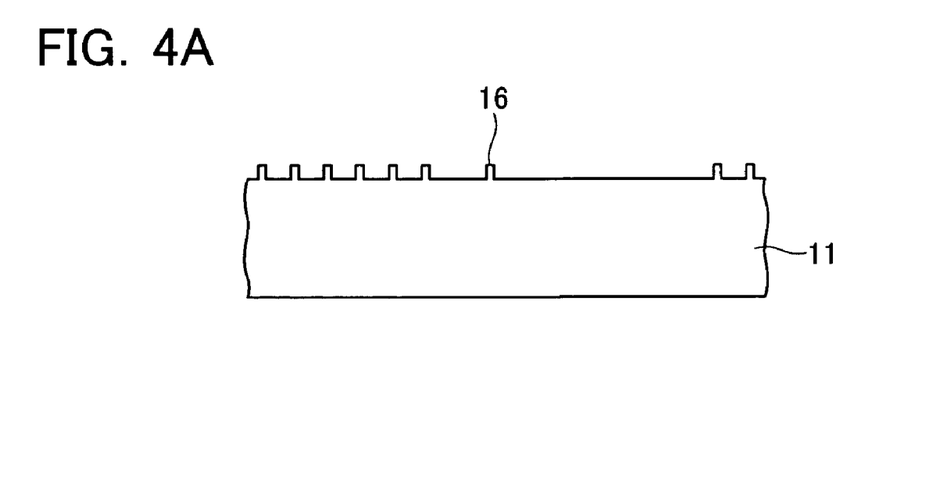
FIGS. 4A-4C are enlarged partial cross-sectional views of the optical disc recording medium shown in turn of the process steps.
Figure 4B:
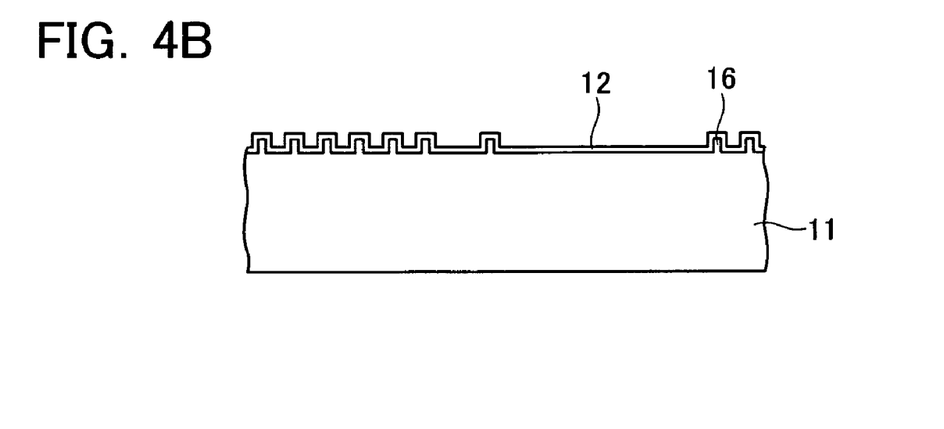
Figure 4C:
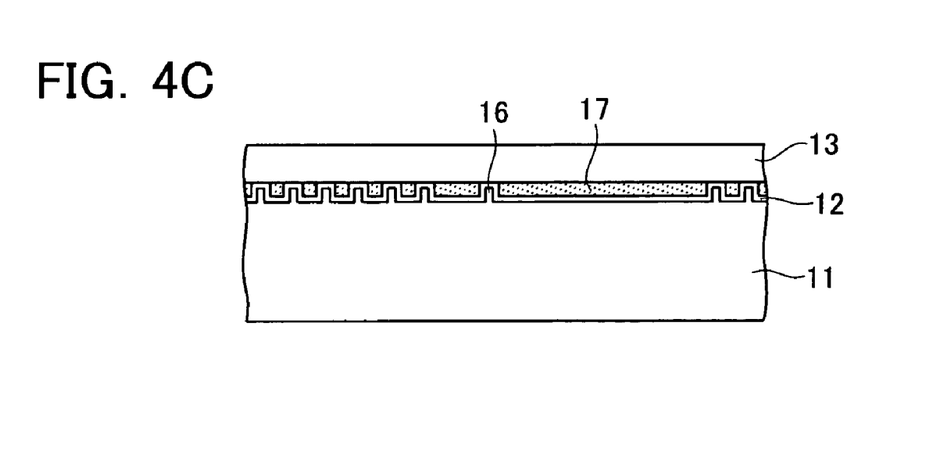
Figure 5A:
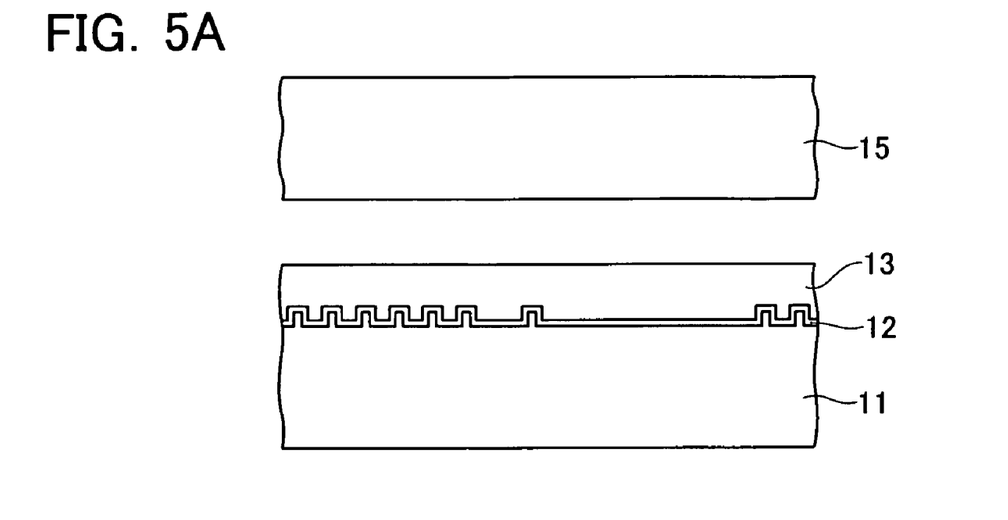
FIGS. 5A and 5B are enlarged partial cross-sectional views of the optical disc recording medium shown in turn of the process steps.
Figure 5B:
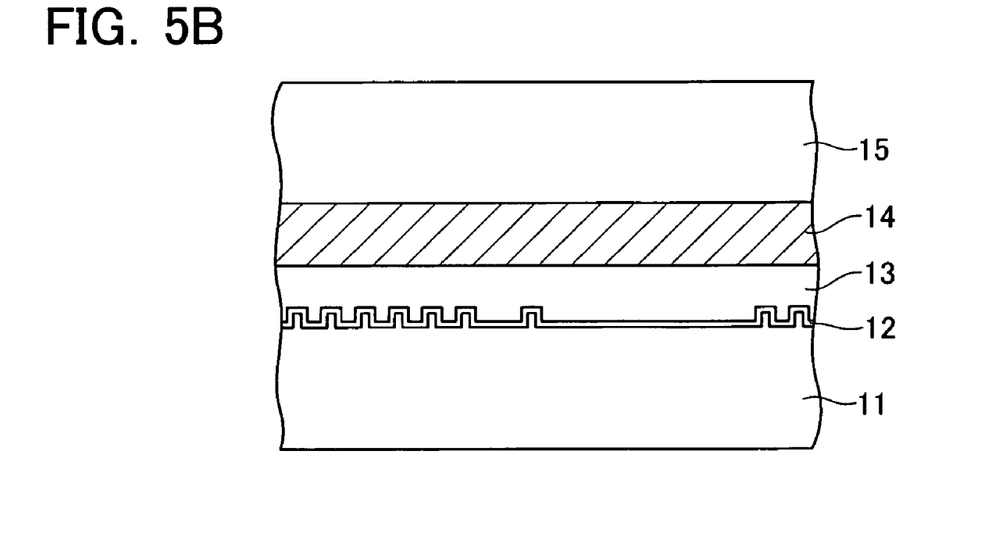

FIG. 3 is a flowchart showing the process steps of manufacturing the optical disc recording medium 1 according to the first embodiment. FIGS. 4 and 5 are enlarged partial cross-sectional views of the optical disc recording medium 1 in the embodiment shown in turn of the process steps.

First, the embossed pits 16 are formed on the first substrate 11 as shown in FIG. 4A (S11). If the first substrate 11 comprises a glass substrate, an UV (ultraviolet) setting resin is applied on the glass substrate by a thickness just corresponding to a depth of roughness of embossed pits. A stamper, not shown, is then pressed against the UV setting resin and UV is irradiated from the opposite side to form the embossed pits. If the first substrate 11 comprises a resin such as polycarbonate, direct molding can be applied to form a substrate with embossed pits.

Next, Al may be evaporated to form the reflective film 12 on the surface of the first substrate 11, on which the embossed pits 16 have been formed, as shown in FIG. 4B (S12).

Subsequently, a transparent adhesive 17 is employed to adhere a resinous film with a thickness of 200 μm on the surface of the first substrate 11, on which the reflective film 12 has been formed, to form the transparent layer 13 as shown in FIG. 4C (S13). The transparent layer 13 may be formed by spin coating if the thickness is controllable.

Then, the second substrate 15 is located at a distance of about 200 μm spacing from the first substrate 11, on which the transparent layer 13 has been formed, as shown in FIG. 5A (S14).

Finally, a recording material is filled in the spacing between the transparent layer 13 and the second substrate 15 to form the recording layer 14 as shown in FIG. 5B (S15).

Figure 6A:
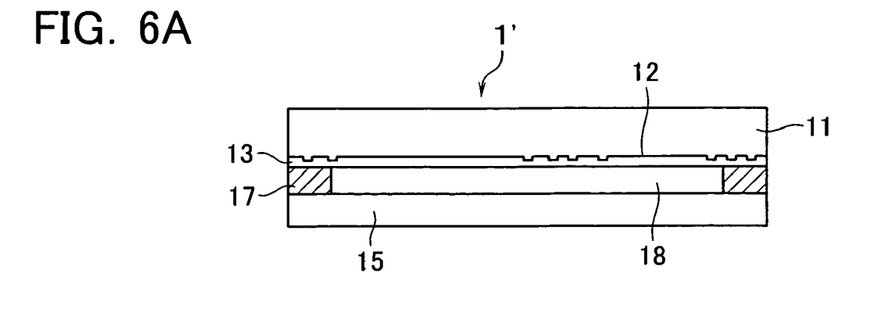
FIGS. 6A and 6B are illustrative views of the step of filling a recording material in the optical disc recording medium.
Figure 6B:
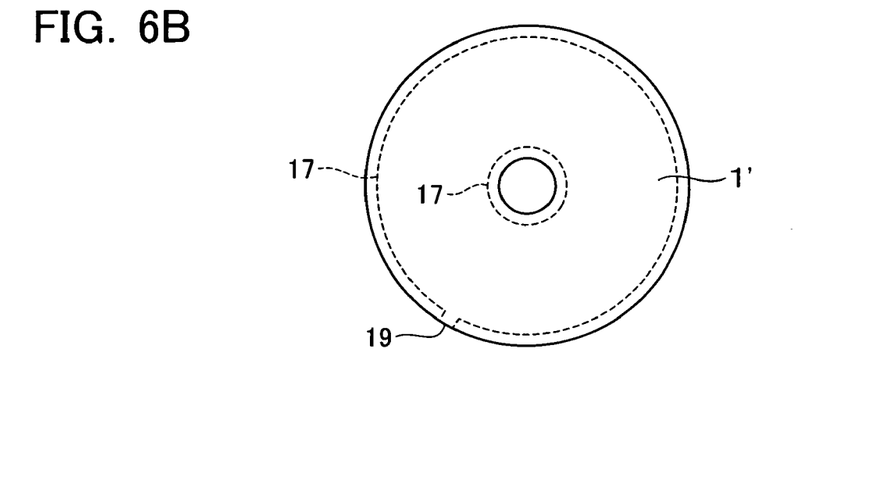
Figure 7:
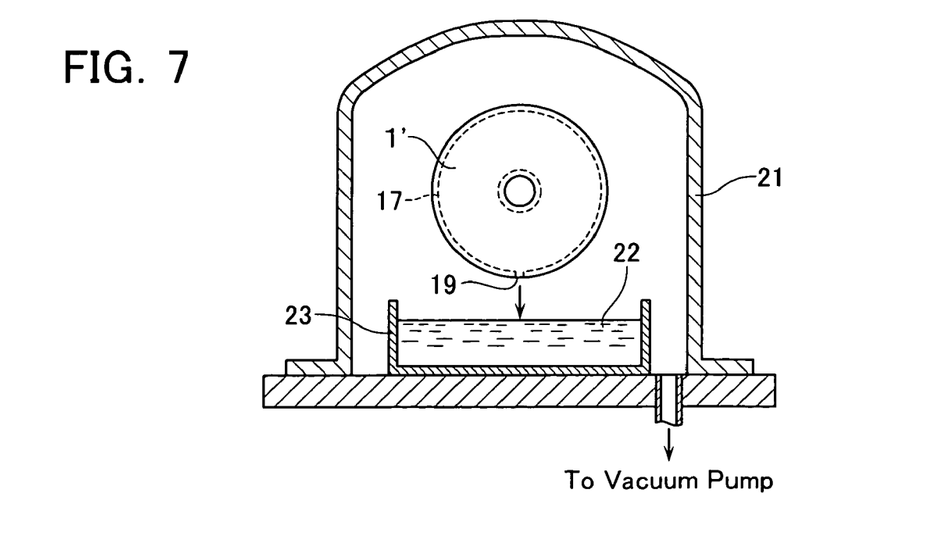
FIG. 7 is an illustrative view of the step of filling a recording material in the optical disc recording medium.

FIGS. 6 and 7 are illustrative views of a specific method of filling a recording material.

As shown in FIGS. 6A, 6B, the circular first substrate 11 with the transparent layer 13 formed thereon and the circular second substrate 15 ensure a certain spacing 18 therebetween by spacers 17 interposed between the outer rims and between the inner rims. The outer rim spacer 17 has an opening 19 in part to communicate the spacing 18 with external via the opening 19.

The disc 1' thus formed is housed in a vacuum chamber 21. A container 23 filled with a recording material or liquid photosensitive agent 22 is further located inside the vacuum chamber 21. In this state, a vacuum pump is driven to reduce pressure in the vacuum chamber 21. In this case, the spacing 18 sandwiched between the first substrate 11 and the second substrate 15 is similarly pressurized as external via the opening 19 to prevent an occurrence of curvature under pressure.

After the pressure inside the vacuum chamber 21 is reduced to a certain pressure, the opening 19 of the disc 1' is slightly sunken beneath the liquid surface of the liquid photosensitive agent 22. Then, the pressure inside the vacuum chamber 21 is restored to normal pressure. In this case, as the spacing 18 in the disc 17 is remained under the reduced pressure, the liquid photosensitive agent 22 is sucked up into the spacing 18. After the liquid photosensitive agent 22 is fully delivered in the spacing 18, the disc 1' is removed from inside the vacuum chamber 21, and the photosensitive agent attached to the liquid contact portion is wiped off. Tiny bubbles may possibly remain at the side opposite to the opening 19. In such the case, the disc is left for a while, directing the opening 19 upward, to emit the bubbles to external via the opening 19. Finally, strong ultraviolet is irradiated only to the opening 19 to set the photosensitive agent to close the opening 19.

Figure 8:
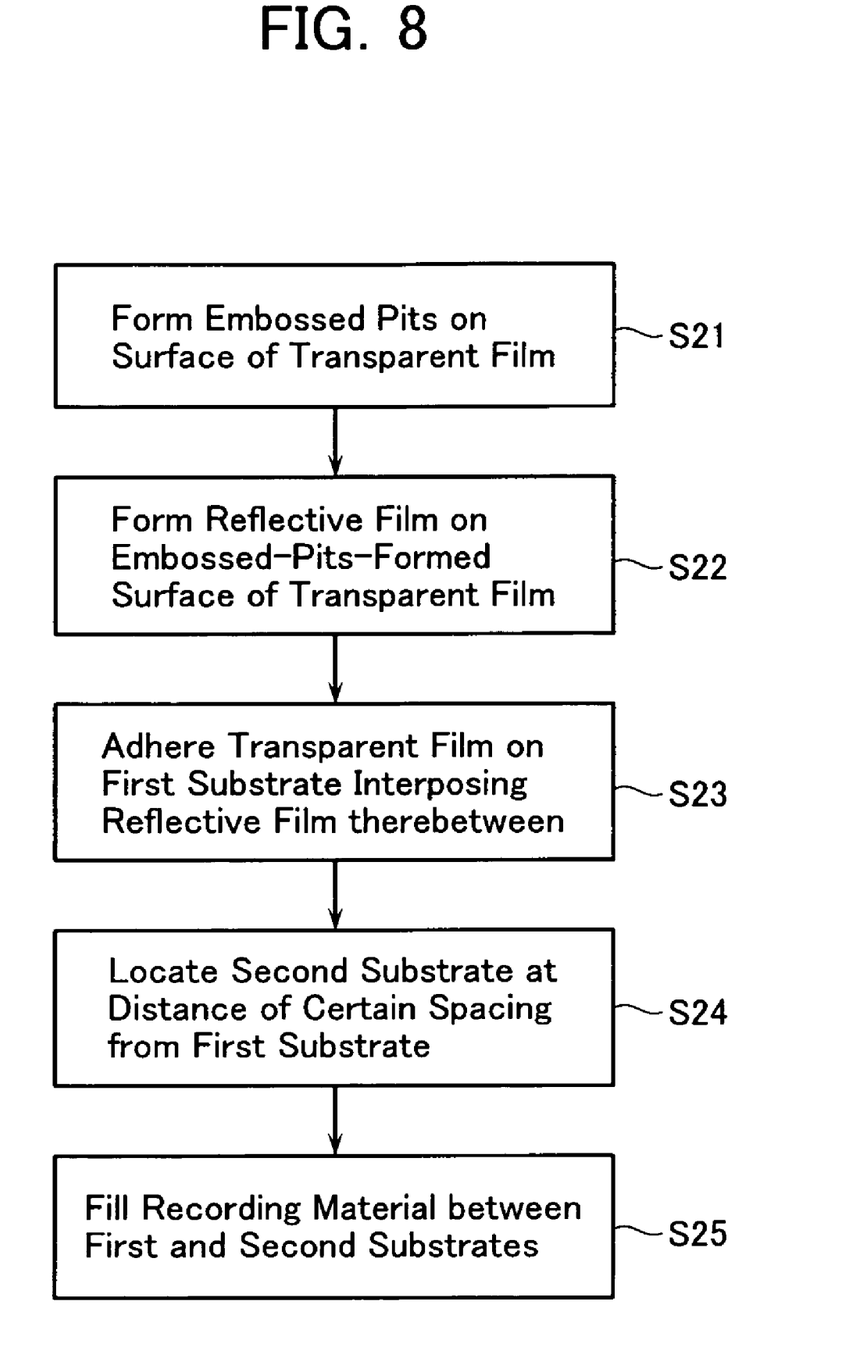
FIG. 8 is a flowchart showing a method of manufacturing the optical disc recording medium.
Figure 9A:
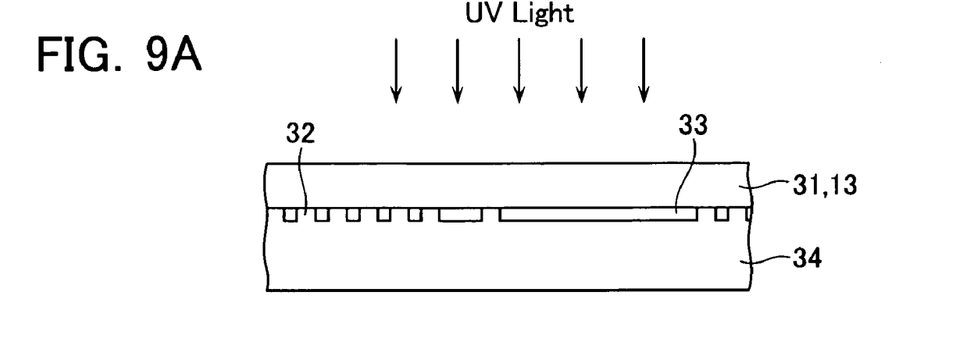
FIGS. 9A-9C are enlarged partial cross-sectional views of the optical disc recording medium shown in turn of the process steps.
Figure 9B:
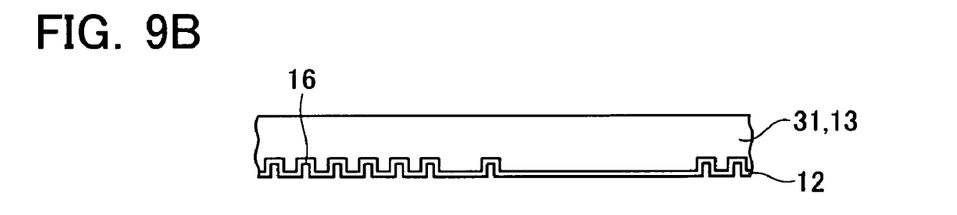
Figure 9C:
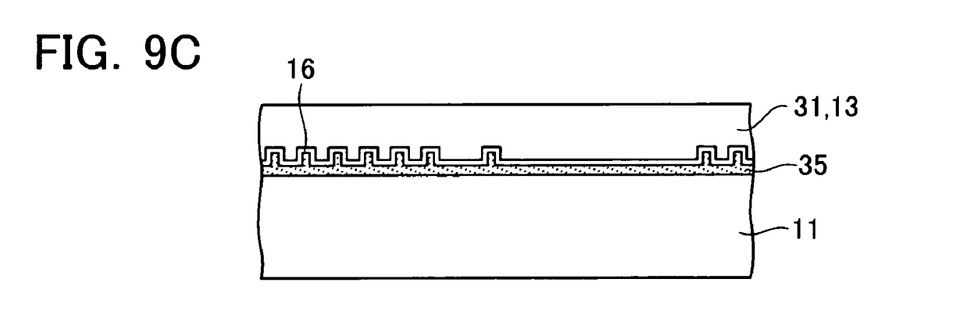

FIG. 8 is a flowchart showing the process steps of manufacturing the optical disc recording medium 1 according to the second embodiment. FIG. 9 shows enlarged partial cross-sectional views of the optical disc recording medium 1 in turn of the process steps.

First, embossed pits 32 are formed on the lower surface of a 200 μm thick resinous film 31 as shown in FIG. 9A (S21). For example, an UV setting resin 33 is applied onto the lower surface of the resinous film 31 and a stamper 34 is pressed against it to form the embossed pits 32.

Subsequently, Al may be evaporated to form the reflective film 12 on the surface of the transparent film 31, on which the embossed pits 32 have been formed, as shown in FIG. 9B (S22).

Then, the resinous film 31 with the embossed pits 16 formed thereon is adhered on the first substrate 11 via an adhesive 35 (S23).

Subsequent steps are similar to those in the previous embodiment and thus their detailed descriptions are omitted.

Figure 10:
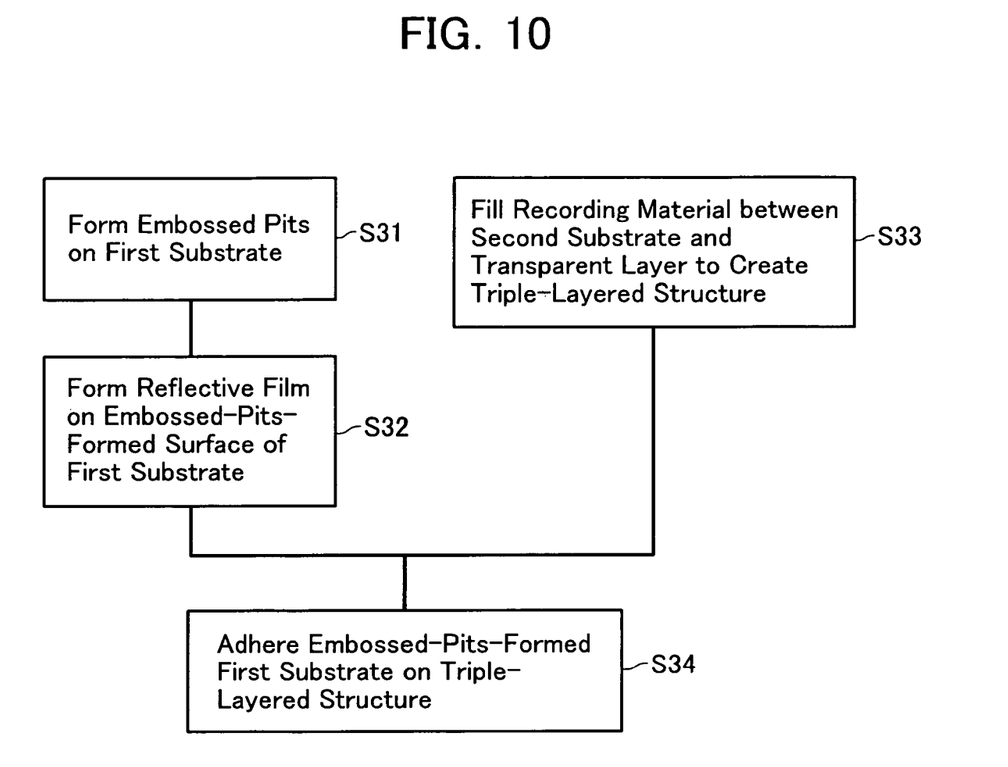
FIG. 10 is a flowchart showing a method of manufacturing an optical disc recording medium according to a third embodiment of the present invention.
Figure 11A:
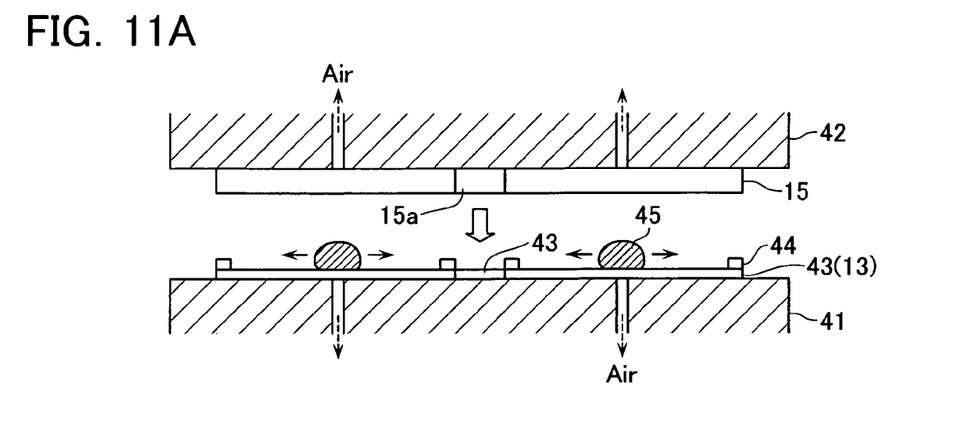
FIGS. 11A and 11B are enlarged partial cross-sectional views of the optical disc recording medium shown in turn of the process steps.
Figure 11B:
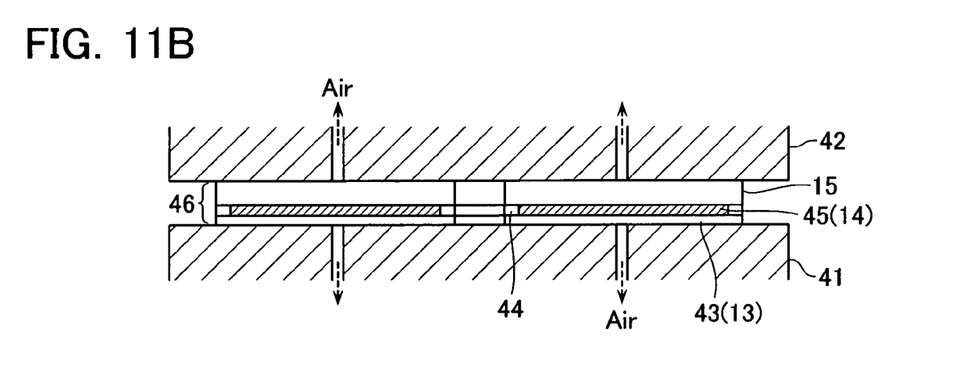
Figure 12:
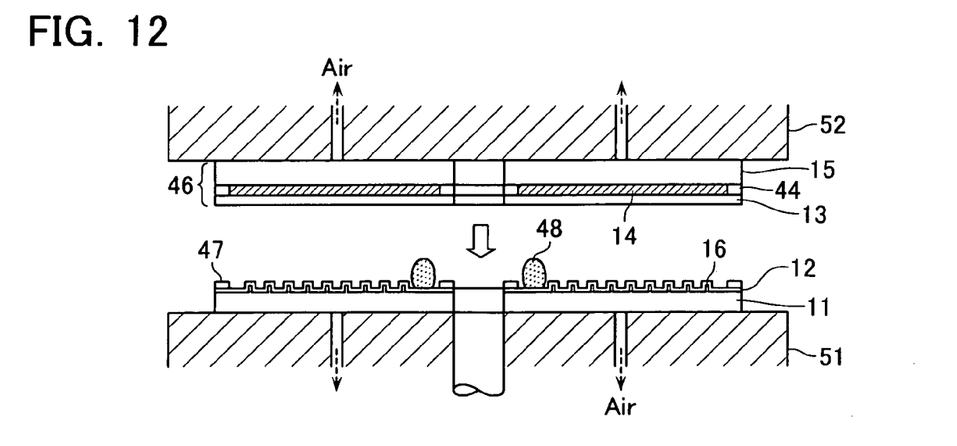
FIG. 12 is an enlarged partial cross-sectional view of the optical disc recording medium shown in turn of the process step.

FIG. 10 is a flowchart showing the process steps of manufacturing the optical disc recording medium 1 according to the third embodiment. FIGS. 11 and 12 are enlarged partial cross-sectional views of the optical disc recording medium 1 shown in turn of the process steps in the embodiment.

First, the embossed pits 16 are formed on the first substrate 11 in the same manner as in the first embodiment (S31). Next, Al may be evaporated to form the reflective film 12 on the surface of the first substrate 11, on which the embossed pits 16 have been formed, in the same manner as in the first embodiment (S32).

Then, the recording material 14 is formed between the 50-430 μm thick transparent layer 13 and the second substrate 15 to create a triple-layered structure (S33). The triple-layered structure may be created as follows, for example. As shown in FIG. 11A, a disk-like transparent plate 43 composed of glass and having a central bore 43a is located on the lower holder 41 of vertically opposing holders 41, 42 to form the transparent layer 13 with a thickness of 50-430 μm, preferably 200 μm. An air sucking force is applied to hold the transparent plate 43. An about 500 μm thick disk-like second substrate 15 having a central bore 15a is located on the lower surface of the upper holder 42. An air sucking force is applied to hold the second substrate 15. Spacers 44 with a thickness of about 200 μm are mounted on the outer rim and the inner rim of the transparent plate 43. A liquid recording material 45 is applied in ring within a certain radial range on the transparent plate 43 to form the recording layer 14. Then, the second substrate 15 held on the upper holder 42 is pressed against the transparent plate 43 to thinly extend the recording material 45 and fill it into the 200 μm thick spacing between the second substrate 15 and the transparent plate 43, thus forming a triple-layered structure 46.

Next, the first substrate 11 with the embossed pits 16 and the reflective film 12 formed thereon is centered and mounted on a rotary table 51, directing the reflective film 12 upward as shown in FIG. 12. A double-sided adhesive tape 47 is affixed to the reflective film 12 at the innermost rim and the outermost rim. A liquid adhesive 48 such as an epoxy adhesive and an anaerobic instantaneous adhesive is applied in ring onto the reflective film 12 at the innermost rim. Next, the triple-layered structure 46 held on the upper holder 51 is mounted on the first substrate 11 with the adhesive 48 applied thereon, directing the transparent layer 13 downward. When the rotary table 51 is rotated, the adhesive 48 flows outward by a centrifugal force and spreads over the entire surface of the reflective film 12. When the adhesive 48 solidifies, the first substrate 11 with the reflective film 12 formed thereon is bonded to the triple-layered structure 46.

The transparent layer 13 is described as 200 μm thick in the above embodiments though it may have any thickness within 50-430 μm.

If the reflective film 12 is formed on the surface of the first substrate 11 or the resinous film 31, a protective film may be formed on the surface of the reflective film 12 to prevent the surface of the reflective film 12 from eroding or damaging in the process steps.

As described above, the thickness of the transparent layer between the recording layer and the reflective film is set to an appropriate value in the present invention. Therefore, it is capable of achieving a high regeneration efficiency and recording at a high recording density effectively.

The invention claimed is:

1. An optical disc recording medium, comprising:
   a first substrate having a physically pre-formatted surface;
   a reflective film formed on said pre-formatted surface of said first substrate;
   a transparent layer with a thickness of 50-430 μm formed on said reflective film;
   a second substrate composed of transparent material and located at a distance of certain spacing from said transparent layer; and
   a recording layer for hologram recording filled between said transparent layer and said second substrate.

2. The optical disc recording medium according to claim 1, wherein said transparent layer has a thickness of about 200 μm.

3. The optical disc recording medium according to claim 2, wherein said first and second substrates have thicknesses of 0.5 mm or more.

4. The optical disc recording medium according to claim 1, wherein said first and second substrates have thicknesses of 0.5 mm or more.

5. An optical disc recording medium, comprising:
   a transparent film with a thickness of 50-430 μm having a physically pre-formatted surface;
   a reflective film formed on said pre-formatted surface of said transparent film;
   a first substrate arranged to support said transparent film interposing said reflective film therebetween;
   a second substrate composed of transparent material and located at a distance of certain spacing from said transparent film; and
   a recording layer for hologram recording filled between said transparent layer and said second substrate.

6. The optical disc recording medium according to claim 5, wherein said transparent layer has a thickness of about 200 μm.

7. The optical disc recording medium according to claim 5, wherein said first and second substrates have thicknesses of 0.5 mm or more.

8. A method of manufacturing an optical disc recording medium, comprising the steps of:
   forming embossed pits on a surface of a first substrate;
   forming a reflective film on said embossed-pits-formed surface of said first substrate;
   forming a transparent layer with a thickness of 50-430 μm on said reflective-film-formed surface of said first substrate;
   locating a transparent second substrate at a distance of certain spacing from said first substrate so as to interpose said transparent layer therebetween; and
   filling a recording material for hologram recording between said first substrate and said second substrate to form a recording layer.

9. The method of manufacturing an optical disc recording medium according to claim 8, wherein the step of forming a transparent layer comprises the step of adhering a transparent film on said reflective-film-formed surface of said first substrate.

10. The method of manufacturing an optical disc recording medium according to claim 8, wherein the step of filling a recording material comprises the step of filling a recording material by reducing pressure in said spacing between said first and second substrates.

11. The method of manufacturing an optical disc recording medium according to claim 8, further comprising the step of forming a protective film on said reflective film formed in the step of forming a reflective film.

12. A method of manufacturing an optical disc recording medium, comprising the steps of:
   forming embossed pits on a surface of a transparent film with a thickness of 50-430 μm;
   forming a reflective film on said embossed-pits-formed surface of said transparent film;
   adhering said transparent film on said first substrate interposing said reflective film therebetween;
   locating a transparent second substrate at a distance of certain spacing from said first substrate so as to interpose said transparent film therebetween; and
   filling a recording material for hologram recording between said first substrate and said second substrate to form a recording layer.

13. The method of manufacturing an optical disc recording medium according to claim 12, wherein the step of filling a recording material comprises the step of filling a recording material by reducing pressure in said spacing between said first and second substrates.

14. The method of manufacturing an optical disc recording medium according to claim 12, further comprising the step of forming a protective film on said reflective film formed in the step of forming a reflective film.

15. A method of manufacturing an optical disc recording medium, comprising the steps of:
   forming embossed pits on a surface of a first substrate;
   forming a reflective film on said embossed-pits-formed surface of said first substrate;
   fixing a transparent plate with a thickness of 50-430 μm on the upper surface of a holder, applying a liquid recording material on said transparent plate, and pressing a transparent second substrate against said recording material to form a recording layer composed of said recording material between said transparent plate and said second substrate, thus forming a triple-layered structure; and
   bonding said reflective-film-formed first substrate and said triple-layered structure together, locating said reflective film faced to said transparent plate.

16. The method of manufacturing an optical disc recording medium according to claim 15, further comprising the step of forming a protective film on said reflective film formed in the step of forming a reflective film.

* * * * *